3,448,045
WATER TREATMENT WITH OZONE
Edwin Austin Hess, 938 Hillcrest Road, Akron, Pa. 17501, and Clarence Schwebel, Hopeland, Pa. 17533
Filed Jan. 24, 1967, Ser. No. 611,318
Int. Cl. C02b 1/18
U.S. Cl. 210—63           12 Claims

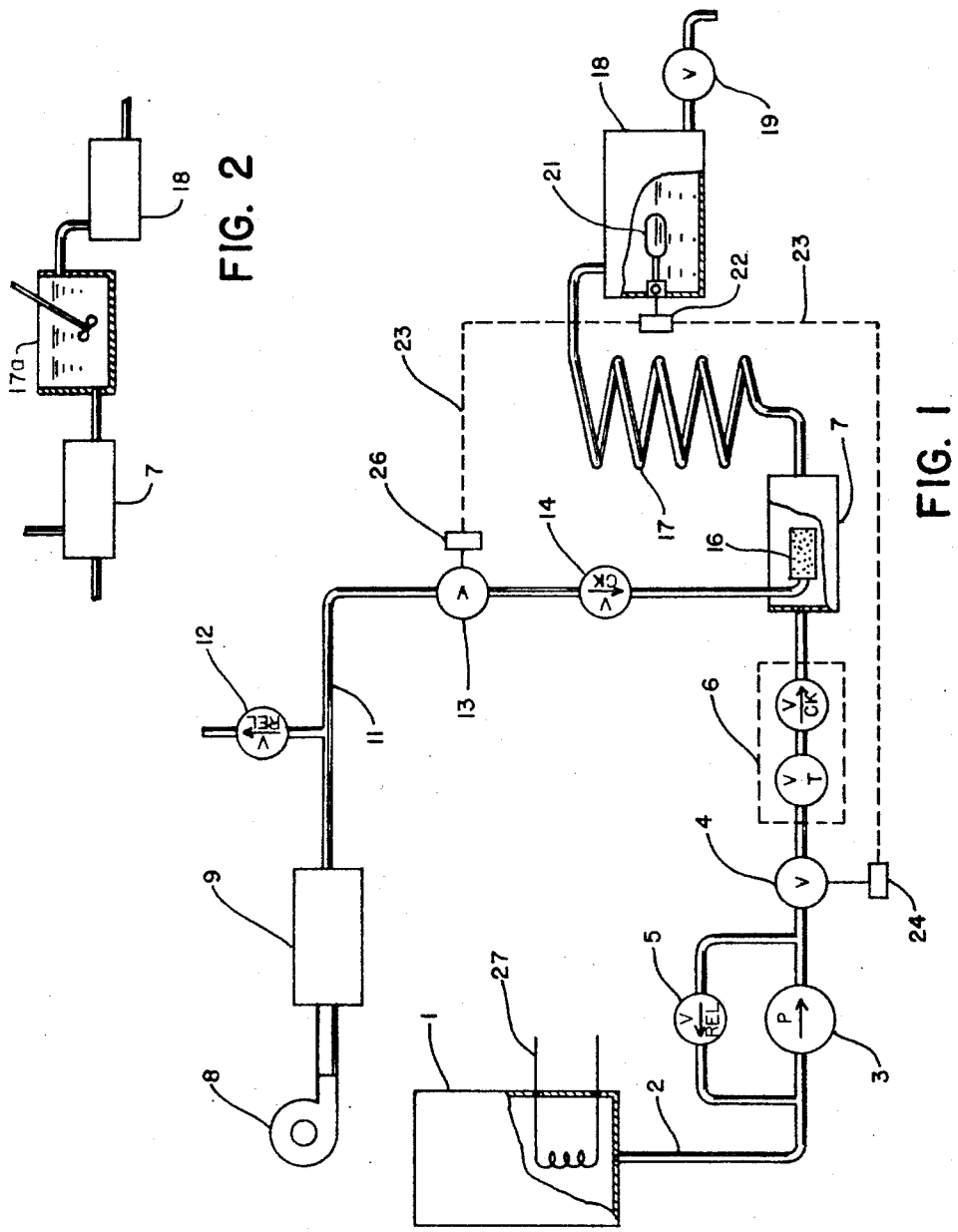

ABSTRACT OF THE DISCLOSURE

A continuous system for disinfecting water with ozone is provided in which effective contact between water and ozone is achieved through controlled conditions of turbulence, temperature and contact time.

---

This invention relates to the disinfection of water and, more particularly, to improved methods and apparatus for treating water with ozone. It will be understood that the disinfection of water refers to processes in which pathogenic organisms present in water are killed in order that the propogation of water-borne diseases may be prevented.

It is well known that the demands for potable water supplies have grown enormously in the past several decades. Not only has it become difficult to find new sources of water, but also, the existing supplies of ground and surface water have become increasingly polluted by industrial and domestic wastes. One consequence of this is that the required treatment of water has become quite complex in order to insure that the various domestic and industrial wastes, chemicals, odors, and pathogenic organisms are removed and the water rendered fit for human consumption. With specific regard to the disinfection of the water, the increased pollution demands larger dosages of chemicals, of which chlorine is the most commonly used in the United States. Unfortunately, the chlorine imparts a distinct and unpalatable taste to the water that cannot conveniently be removed in further processing of the water and, when highly chlorinated, the water will not only taste bad by itself, but also, the taste will permeate foods being cooked in it and it will impart a rather medicinal flavor to beverages such as coffee and tea.

To meet the rising demand for pure water that is substantially free from objectionable odors and tastes, it has become a common practice to bottle water obtained from comparatively pure and uncontaminated sources and use this for drinking and cooking. Even when this water is obtained from springs and wells in rural areas where the ground water is substantially free from industrial and domestic wastes, it is frequently necessary, in order to meet the standards of purity as set by various government health agencies, to disinfect the water and reduce the pathogenic organisms to a safe level. It is at once obvious that if chlorine is used as the disinfectant, the entire purpose of preparing bottled water will be nullified.

For the above reason, in preparing pure bottled water it is important to provide methods for the disinfection of water that will not impart any characteristic odor or taste to the water. Such methods include, for example, treatment with ultraviolet rays, heating, boiling or distilling, exposure to ultrasonic waves, treatment with ozone, and several other methods. This invention, however, is concerned only with the disinfection of water by treatment with ozone. This treatment is preferred in preparing pure bottled water since: ozone is a strong disinfectant that is most effective in destroying pathogenic organisms; ozone is a strong oxidizing agent that is effective to remove colors, odors and tastes from the water; ozone is comparatively inexpensive; and most importantly, if ozone is used under properly controlled conditions, it will not impart any distinctive flavor or odor of its own to the water.

While the treatment of water with ozone leaves no chemical remains in the water, this method of disinfection is generally rather inefficient and is difficult to control. First, ozone is quite unstable and will disintegrate rapidly. Second, ozone is only slightly soluble in water, and thus it is difficult to get effective gas/water contact during treatment. Third, as has been suggested by some authorities, the effect of ozone is not instantaneous and a certain minimum contact time with the water is required. All of these factors impose considerable difficulties in the disinfection of water with ozone if the process is to be conducted efficiently and reliably.

While the instability of the ozone and its low solubility create certain problems in the disinfection of water, it is these same properties that make the use of ozone highly desirable. Since the ozone is unstable and will readily disintegrate, and since ozone is only slightly soluble in water, water that has been properly treated with ozone will have no residual odor or taste, even though ozone by itself has a strong characteristic pungen odor.

Due to the difficulties of obtaining effective contact between water and ozone, it has been common practice, when disinfecting water, to dose the water with quantities of ozone in considerable excess of that required. In addition to being wasteful of ozone, these processes are inefficient in that the concentration of ozone will vary quite considerably between isolated regions of water being treated. Some of the water may not be adequately disinfected, while other water may be bottled with an appreciable excess of ozone. In the first instance, the hazard to health is obvious. In the second instance, the excess ozone may separate from the water during storage and gather at the top of the bottle. When the bottle is then opened, an initial discharge of ozone will take place that will confront the prospective consumer with a pungent odor. While this occurrence is not in itself harmful or dangerous, it may cause the consumer to believe that the water is contaminated. Further, if the water is then tasted, the consumer will frequently believe the water tastes bad and has spoiled through association with the pungent odor of the free ozone.

For the above reasons, it is important that the ozonation of water be conducted efficiently so that only the amount of ozone that is necessary to provide for disinfection be added. It is at once obvious that too little ozone cannot be tolerated as the water might not be adequately disinfected, and on the other hand, any considerable excess of ozone is equally undesirable from the standpoint of the psychological impact upon the consumer if he is initially confronted with a pungent odor.

It might be thought that the proper amount of ozone to add to the water would be just sufficient to provide for complete disinfection and destruction of odors and colors. However, in general practice, it has been found desirable to add a slight excess of ozone in order that there will be some residual disinfecting power at the time the water is added to the bottle. It should be appreciated that the water must remain in the bottle sometimes for appreciable lengths of time, and therefore it is desirable to have some remaining disinfecting power to insure that the water does not sour during storage. Quite generally, from about 0.05 to about 0.5 p.p.m., and more preferably about 0.2 p.p.m., free ozone in the water at the time of bottling will suffice to provide this residual disinfecting power.

Accordingly, it is an object of this invention to provide improved methods and apparatus for preparing water that is essentially free from odors, color, taste and pathogenic organisms.

Another object of this invention is to provide improved methods and apparatus for contacting water with ozone.

Still another object of this invention is to provide methods and apparatus whereby water can be treated efficiently and reliably with ozone in such a manner that odors, color, taste and pathogenic organisms are removed or destroyed without leaving excessive residual quantities of ozone in the water.

Briefly, these and other objects of this invention are achieved by providing a water purification system in which water and ozone are thoroughly mixed and detained under conditions of controlled turbulence. Preferably, certain electrical control circuits are utilized to regulate the system and, in some instances, water temperature regulating means are included.

The invention will be better understood in connection with the accompanying drawings, in which:

FIG. 1 is a schematic diagram, partially in section, of a water purification system constructed in accordance with the teachings of this invention; and FIG. 2 is a schematic drawing of a device for obtaining turbulence in mixing water and ozone.

FIG. 1 generally shows, in schematic form, a preferred system for practicing the instant invention. A water storage tank 1 is provided that communicates via a conduit 2, a pump 3, a stop valve 4, and a metering check valve 6 to a gaseous diffuser 7. Also, a relief valve 5 is provided in a bypass conduit associated with pump 3. While the details of the diffuser 7 are of no particular importance to this invention, it may be mentioned that preferably the diffuser will include in its interior a porous ceramic cylinder 16 having pores of such a size that will permit the passage of gas but not liquid.

A blower 8 is provided that communicates on its inlet side with the atmosphere and discharges into an ozone generator 9. The ozone generator 9 communicates via a conduit 11, a stop valve 13, and a check valve 14, to the ceramic cylinder 16 of the diffuser 7.

The diffuser 7 discharges into a conduit 17 that presents an elongated, tortuous path that discharges at filling station 18. The filling station 18 includes a filling valve 19, a float 21, and an electric switch 22 that is mechanically associated with float 21. Electrical switch 22 is electrically connected by conductors 23 to solenoids 24 and 26 that control the positions of stop valves 4 and 13 respectively.

As shown in the drawing, a heating element 27 may be included within the tank 1.

In operation, the storage tank 1 is filled with water and then pump 3, blower 8 and ozone generator 9 are started. Stop valve 4 is shut, causing relief valve 5 to open and circulate water continuously in a closed loop from the discharge side of the pump 3 to its inlet side.

Valve 13 is also shut and the pressure of the ozone-enriched air in line 11 causes relief valve 12 to open and discharge the ozone to the atmosphere. Next, a quantity of water is withdrawn from filling station 18 by way of valve 19, float 21 moves to a lower position, and thus switch 22, acting through solenoids 24 and 26, causes valves 4 and 13 respectively to open. When valve 4 is opened, the pressure in line 2 is relieved, the relief valve 5 shuts, and water immediately flows through metering check valve 6 into the diffuser 7. In like manner, when stop valve 13 is opened, the pressure in line 11 is relieved, the relief valve 12 shuts, and an immediate flow of ozone commences via check valve 14 into the ceramic cylinder 16 of the diffuser 7. As the gas pressure within line 11 is maintained at a slightly higher pressure than the water pressure discharged from pump 3, the ozone-enriched gases will percolate through the side walls of the porous ceramic cylinder 16 and become entrained in the flow of water passing through diffuser 7. This mixture of water and ozone then enters conduit 17 and is carried along a tortuous path whereby sufficient turbulence is induced to cause the water and ozone to be thoroughly mixed with each other. It is important that the conduit 17 be sufficiently long to provide adequate detention time between the water and ozone to insure thorough mixing prior to the discharge of the mixture at the filling station 18. By these means, adequate purification and disinfection is obtained.

When valve 19 is shut, water will accumulate at filling station 18 until such time as float 21 rides high enough to activate electrical switch 22. At this time, solenoids 24 and 26 will cause valves 4 and 13 to shut, thus discontinuing any further flow of purified water to the filling station 18. It can be understood that as valve 4 is shut, relief valve 5 will open, enabling water to circulate around pump 3. Similarly, as valve 13 is shut, relief valve 12 will open, enabling the discharge of ozone containing gases to the atmosphere.

It will be noted that in the above system, the ozone generator 9 is continuously in operation whether or not there is any demand by the system for ozone. There are several important reasons why the ozone generator should be operated continuously rather than intermittently. First, the useful life of the ozone generator will be increased by operating it continuously rather than intermittently. First, the useful life of the ozone generator will be increased by operating it continuously under uniform conditions. Second, and more importantly, a certain amount of time is required at start up until the ozone generation becomes stabilized. Thus, by operating the ozone generator continuously, there is always available an immediate supply of ozone of known strength and quality whenever demanded by the system.

For somewhat similar reasons, although not of as great an importance, it is generally useful to operate pump 3 continuously rather than intermittently. By this means, a constant source of water at a predetermined pressure is always available upon demand of the system without any delay starting the pump and waiting for it to reach operating speeds.

In the preferred practice of this invention, it is generally desirable for the ozone-treated water discharged from filling station 18 to contain from about 0.05 p.p.m. to about 0.5 p.p.m. of free ozone. More preferably, as mentioned above, there should be present about 0.2 p.p.m. The system as shown in the drawing may readily be adjusted to provide this proper level of free ozone. In practice, the blower 8 and the ozone generator 9 will be started and allowed to operate until a uniform quantity and quantity of ozone is being discharged from the ozone generator 9. At this time, the stop valves 13 and 4 are opened to enable water and ozone to flow through diffuser 7. Samples of ozone-treated water discharging from conduit 17 are taken and tested for ozone content, and if the ozone content is too high, metering check valve 6 is opened to enable a greater flow of water to the diffuser 7, and if the ozone content is too low, the orifice at metering check valve 6 is closed down, thus reducing the flow of water to the diffuser 7.

Alternatively, the ozone content of the water may be varied by adjusting the output of the ozone generator 9, as by changing the voltage or the speed of the blower 8. However, in practice it is generally simpler and more accurate to adjust the flow of water rather than that of the ozone.

With regard to the conduit 17, it has been previously pointed out that this provides the function of providing a tortuous path for the flow of the mixture of water and ozone and providing an elongated path that will provide sufficient detention time to insure that the water is adequately contacted with ozone. The tortuous nature of the path will provide turbulence and insure intimate contact between the ozone and water. Generally, the water and ozone should be contacted under conditions of turbulent mixing for at least 3 seconds, and more preferably, for a period of about 10 seconds. By these means, an intimate admixture of the ozone and water will be insured.

Referring to FIG. 2, another means for detaining the mixture of ozone and water under conditions of turbulence is shown. Here, after passing through the diffuser 7, the water and ozone are detained in a small vessel provided with an impeller. Due to the mechanical action of the impeller, the ozone is intimately admixed with the water.

It can be appreciated that many different types of detention units can be designed that will impart turbulence between the water and the gas. For example, if the diameter of the pipe is sufficiently reduced and the pressure made sufficiently great, highly turbulent flow can be achieved through the pipe. Also, instead of providing a tortuous path as shown in FIG. 1, internal baffles and deflectors may be used to impart the necessary turbulence to insure intimate contact.

It should be noted also that it is possible to impart too much turbulence to the liquid-gaseous mixture. If the energy level becomes too high, it may have the effect of deaerating the water and thus driving the ozone out of it. Accordingly, it can be appreciated that the turbulence should be sufficiently great so as to insure intimate contact between the water and the gas, but on the other hand, not so excessive as to cause deaeration.

In addition to the above, to insure uniform treatment of the water with the ozone, it may be important to regulate the temperature of the system. For these reasons, when required, a heater element 27 can be included within the storage tank 1. It can be readily understood that the solubility of the ozone in water will vary with changes in temperature. Complete uniformity can only be obtained when the temperature is stabilized. Further, if the treatment temperature is too cool, an excess of ozone may be dissolved in the water so that, upon standing at higher temperatures, ozone may be released from the water and provide an objectionable discharge of pungent gas upon the opening of a bottle of water. This condition is likely to happen any time the water temperature is low in comparison to the ambient temperature at which the water is stored. For this reason, in the preferred practice of this invention, it is desirable to first control the temperature to be within a fairly narrow range, and second, select a temperature that will, at least in part, approach the temperature at which water may be stored. While there is no exact criticality to the value chosen, it is generally convenient to use water temperatures of between about 70 and 75° F.

EXAMPLE

Apparatus such as schematically illustrated in FIG. 1 was assembled and operated as follows. A commercially available ozone generator 9 (Welsbach Model W–5) rated to operate at 110 volts, 7 amps, was supplied with a continuous source of air from a low pressure blower 8 at a pressure of about 8–10 lbs./sq. in. Relief valve 12 was set to relieve pressure in line 11 at a pressure of about 10 p.s.i.

Initially, the blower 8 and the ozone generator 9 were operated for a period of time with stop valve 13 shut and the ozone-enriched air being discharged to the atmosphere via relief valve 12.

A pump 3 was provided of the centrifugal type having a pressure output of from about 5 to about 8 lbs. The relief valve 5 was set to open at a pressure of 8 lbs. After steady operating conditions of both the pump 3 and the ozone generator 9 had been obtained, switch 22 was actuated, causing stop valves 13 and 24 to open and provide a supply of ozone and water to diffuser 7. The mixture of water and ozone leaving the diffuser 7 was introduced into a coil 17 of rigid polyvinyl chloride pipe that had a total length of 70 feet and an internal diameter of 2 inches. As the pump 3 was delivering water at a rate of about 30 gallons per minute, the detention time of the mixture of ozone and water within the tortuous path 17 was about 23 seconds. The metering check valve 6 was adjusted so that the flow into diffuser 7 was such that the water leaving filling station 18 contained about 0.2 p.p.m. free ozone.

The water so treated was found to be sufficiently disinfected to meet all health standards for potable water. The slight excess of free ozone was adequate to provide residual disinfection power to prevent the water from going sour when bottled and stored without refrigeration for prolonged periods, and at the same time, was not so great as to cause a pungent odor to be released upon opening of a bottle of water.

While the invention has been described with particular reference to a system for bottling water, it should be understood that it is not so limited, but may be equally adapted for use in municipal water treatment plants and the like. For example, not only will a system such as disclosed above be of use in municipal water systems, but may be highly desirable for use in bottling plants and breweries and the like where a supply of pure water is required that is disinfected, but has no residual taste or odor.

Although certain embodiments of this invention have been shown in the drawings and described in the specification, it is to be understood that the invention is not limited thereto, is capable of modification, and can be rearranged without departing from the spirit and scope of the invention.

We claim:
1. A method for disinfecting water with ozone comprising the steps of:
continuously generating ozone-containing gases;
diffusing the ozone-containing gases into a moving stream of water to form an initial mixture of ozone and water;
introducing said initial mixture into a turbulent zone wherein turbulence is induced in said mixture;
detaining said initial mixture within said turbulent zone to insure thorough contact between said ozone and water;
discharging a mixture of ozone and water from said turbulent zone into a storage vessel;
stopping and starting the diffusion of ozone and the movement of the stream of water by the demand of the storage vessel for disinfected water; and
discharging the continuously generated ozone-containing gases to atmosphere when there is no demand by the storage vessel for disinfected water.

2. A method according to claim 1 in which said turbulent zone is comprised of an elongated, tortuous path.

3. A method according to claim 1 in which said turbulent zone is comprised of a vessel with impeller means mounted therein.

4. A method according to claim 1 in which said initial mixture is detained within said turbulent zone for at least 3 seconds.

5. A method according to claim 4 in which said initial mixture is detained within said turbulent zone for at least 10 seconds.

6. A method according to claim 1 in which the water leaving said turbulent zone has a free ozone content of from about 0.05 p.p.m. to about 0.5 p.p.m. uniformly mixed with and distributed throughout said water.

7. A method according to claim 1 in which the water in said moving stream is maintained at a uniform temperature.

8. A method according to claim 1 including the steps of continuously pumping water to establish the moving stream of water and discharging the continuously pumped water to a point hydraulically on the suction side of the pump when there is no demand by the storage vessel for disinfected water.

9. A system for disinfecting water by contacting said water with an ozone-enriched gas comprising:
a source of water;
an electrically operated ozone generator adapted for continuous operation;
gas diffusion means for contacting water with ozone;
first conduit means leading from said source of water to said gas diffusion means;
pump means to move water under pressure through the first conduit means;
second conduit means leading from said ozone generator to said gas diffusion means;
gas mixing means connected with said gas diffusion means and adapted to receive products discharged by said gas diffusion means;
first valve means to control the flow of water in said first conduit means;
second valve means to control the flow of ozone in said second conduit means and pressure relief means to discharge ozone from the second conduit means to atmosphere;
means to discharge ozone-treated water from said system; and
means responsive to the demands of the system to open and shut the first and second valve means without interrupting the continuous operation of the ozone generator.

10. A system according to claim 9 in which said mixing means is comprised of an elongated, tortuous conduit.

11. A system according to claim 10 in which said tortuous path is sufficiently long to enable detention of water and ozone for at least 3 seconds therein and the water discharged from the system has a free ozone content of from about 0.05 p.p.m. to about 0.5 p.p.m. uniformly mixed with and distributed throughout said water.

12. A system according to claim 9 in which the first conduit means includes pressure relief means to recycle water from the discharge side of the pump means to the source of water when the first valve means is shut.

References Cited

UNITED STATES PATENTS

| | | | |
|---|---|---|---|
| 835,886 | 11/1906 | Gunn | 210—63 X |
| 1,124,600 | 1/1915 | Franklin | 210—63 |
| 2,009,230 | 7/1935 | Hartman | 210—63 |
| 2,043,701 | 6/1936 | Hartman | 210—63 X |
| 2,660,559 | 11/1953 | Prime | 210—63 |
| 2,812,861 | 11/1957 | Bickford | 210—198 X |
| 3,210,053 | 10/1965 | Boester | 211—93 X |

REUBEN FRIEDMAN, *Primary Examiner.*

JOHN ADEE, *Assistant Examiner.*

U.S. Cl. X.R.

210—64, 127, 192